(12) United States Patent
Dong

(10) Patent No.: US 8,991,710 B2
(45) Date of Patent: Mar. 31, 2015

(54) POWER NEGOTIATION IN A COMMUNICATIONS DEVICE

(75) Inventor: Olivier Dong, Reading (GB)

(73) Assignee: Lenovo Innovations Limited (Hong Kong), Quarry Bay (HK)

(*) Notice: Subject to any disclaimer, the term of this patent is extended or adjusted under 35 U.S.C. 154(b) by 0 days.

(21) Appl. No.: 13/262,584

(22) PCT Filed: Feb. 26, 2010

(86) PCT No.: PCT/JP2010/053694
§ 371 (c)(1),
(2), (4) Date: Sep. 30, 2011

(87) PCT Pub. No.: WO2010/113596
PCT Pub. Date: Oct. 7, 2010

(65) Prior Publication Data
US 2012/0024949 A1  Feb. 2, 2012

(30) Foreign Application Priority Data
Apr. 3, 2009  (GB) .................................. 0905798.5

(51) Int. Cl.
*G06K 19/07* (2006.01)
*H04W 52/02* (2009.01)

(52) U.S. Cl.
CPC ................................ *H04W 52/0261* (2013.01)
USPC ........................................ 235/492; 235/451

(58) Field of Classification Search
CPC ................................................. H04W 52/0261
USPC ............ 235/380, 451, 492; 365/226; 713/300
See application file for complete search history.

(56) References Cited

U.S. PATENT DOCUMENTS

| 4,727,244 A | 2/1988 | Nakano et al. |
| 7,969,809 B2 * | 6/2011 | Ben-Rubi ..................... 365/226 |

(Continued)

FOREIGN PATENT DOCUMENTS

| CN | 101123608 A | 2/2008 |
| EP | 0 599 244 A2 | 6/1994 |

(Continued)

OTHER PUBLICATIONS

ETSI Technical Committee Smart Card Platform. ETSI TS 102 600: "Smart Cards; UICC—Terminal interface; Characteristics of the USB interface". V7.4.0 [online], Jan. 2009 [retrieved on Aug. 22, 2012] Retrieved from the Internet:< URL: http://www.etsi.org/>.*

(Continued)

*Primary Examiner* — Thien T Mai
*Assistant Examiner* — Toan Ly
(74) *Attorney, Agent, or Firm* — Sughrue Mion, PLLC

(57) ABSTRACT

A mobile device is provided having a smart card. The smart card is powered by the mobile device and a maximum power supply value is defined by the mobile device to control the power drawn by the smart card. Provision is made for the smart card to inform the mobile device of the processes supported by the smart card and their classes of current. Provision is also made for the smart card to inform the mobile device whether or not the smart card supports high density memory. The mobile device is operable to use the information provided by the smart card to determine the optimal or best value of electrical current that is to be made available to the smart card.

2 Claims, 2 Drawing Sheets

(56) References Cited

U.S. PATENT DOCUMENTS

| | | | |
|---|---|---|---|
| 2004/0003300 A1* | 1/2004 | Malueg et al. | 713/300 |
| 2006/0226243 A1* | 10/2006 | Dariel | 235/492 |
| 2007/0183179 A1 | 8/2007 | Maeda et al. | |
| 2007/0210174 A1 | 9/2007 | Deprun et al. | |
| 2007/0211551 A1* | 9/2007 | Yogev et al. | 365/226 |

FOREIGN PATENT DOCUMENTS

| | | |
|---|---|---|
| EP | 1 833 006 A2 | 9/2007 |
| EP | 1 835 770 A2 | 9/2007 |
| JP | 62-017863 A | 1/1987 |
| JP | 2007-242024 A | 9/2007 |
| KR | 2007-0092685 A | 9/2007 |
| WO | 02/069655 A2 | 9/2002 |
| WO | 2005/015406 A1 | 2/2005 |

OTHER PUBLICATIONS

ETSI Technical Committee Smart Card Platform. ETSI TS 102 221: "Smart Cards; UICC—Terminal interface; Physical and logical characteristics". V7.13.0 [online], Jan. 2009 [retrieved on Aug. 22, 2012] Retrieved from the Internet:< URL: http://www.etsi.org/>.*

ETSI Technical Committee Smart Card Platform. ETSI TS 102 412: "Smart Cards; Smart Card Platform Requirements Stage 1". V9.1.0 [online], Jun. 9, 2009 [retrieved on Aug. 14, 2014] Retrieved from the Internet:< URL: http://www.etsi.org/>.*

ETS TS 102 221, V7.18.0 (Oct. 2010), Smart Card; "UICC—Terminal interface; Physical and logical characteristics", ETSI , 2010, (Release 7).

ETS TS 102 600, V7.8.0 (Oct. 2010), Smart Card; "UICC—Terminal interface; Characteristics of the USB Interface" , ETSI, 2010, (Release 7).

ETS TS 102 223, V7.16.0., (Jan. 2011) , Smart Cards, Card Application Toolkit (CAT), ETSI, 2011, (Release 7).

Search Report dated Apr. 5, 2013 issued by the European Patent Office in counterpart European Patent Application No. 10758372.6.

Korean Office Action dated Dec. 26, 2012 issued in corresponding Korean Patent Application No. 2011-7026188.

Office Action dated Oct. 10, 2013, issued by the State Intellectual Property Office of the People's Republic of China in counterpart Chinese Application No. 201080014231.8.

* cited by examiner

POWER NEGOTIATION IN A COMMUNICATIONS DEVICE

This application is a National Stage of International Application No. PCT/JP2010/053694 filed Feb. 26, 2010, claiming priority based on British Patent Application No. 09.05798.5, filed Apr. 3, 2009, the contents of which are incorporated herein by reference in their entirety.

TECHNICAL FIELD

The present invention relates to communications equipment and in particular to mobile equipment (ME) having a Universal Integrated Circuit Card (UICC) therein and the way in which power requirements are negotiated between the ME and the UICC. The invention also relates to the mobile equipment, the UICC and to the methods performed therein.

BACKGROUND ART

MEs such as mobile telephones include a UICC which, among other things, holds secure data for identifying the user to the core network. The UICC is a smart card that has an inbuilt microprocessor and memory which can run a number of software applications. The UICC is powered by the battery within the ME. The standards setting Organisation ETSI is in the process of finalising Release 7 of its standards documents (including TS 102 221, TS 102 600 and TS 102 223) relating to the interaction between the ME and its UICC. This standards documentation specifies that the ME negotiates the maximum power supply that will be made available to the UICC before any applications are selected/activated when the ME is powered up.

This current power negotiation mechanism (over the USB interface) is based on the following request and response:

a) Request Sent by the ME to the UICC (Get Interface Power Request)

| Offset | Field | Size | Value | Description |
|---|---|---|---|---|
| 0 | bmRequest | 1 | 'C0'/ '40' | 'C0' for Get Interface Power '40' for Set Interface Power Characteristics of request: b8: 1 = Device-to-host/0 = Host-to-device b7 . . . 6: Type 2 = Vendor b5 . . . 1: Recipient 0 = Device |
| 1 | bRequest | 1 | '01'/ '02' | Get Interface Power Request Set Interface Power Request |
| 2 | wValue | 2 | '0000' | |
| 4 | wIndex | 2 | '0000' | |
| 6 | wLength | 2 | '0002' | Number of bytes in the data stage | b) Response Data Sent by the UICC to the ME:

| Offset | Field | Size | Value | Description |
|---|---|---|---|---|
| 0 | bVoltageClass | 1 | | Indicates the voltage classes supported by the UICC. If a class is supported, the corresponding bit is set to 1. b1    Class A, reserved for USB 2.0 (optional use, not specified by ETSI SCP) b2    Class B b3    Class C' b7 . . . 4    Reserved for Future Use, shall be set to 0 b8    Class B activation preferred (see clause 7.1) |
| 1 | bMaxCurrent | 1 | | Maximum current that the UICC requires for best performance, expressed in 2 mA units. e.g. '0A' indicates 20 mA. |

DISCLOSURE OF THE INVENTION

The bVoltageClass byte indicates all the voltage classes supported by the UICC and the bMaxCurrent byte specifies the value of the electrical current that would be required by the UICC for "best performance". However, the inventor has realised that simply specifying bMaxCurrent may not be very helpful for the ME to determine what would be the optimal maximum value of the electrical current to be made available for the UICC because:

this value (bMaxCurrent) is indicated independently of the voltage class, whereas the UICC power consumption may directly depend on the voltage, i.e. the electrical current required for voltage classes B and C' is usually not the same;

the support of high density memory (which requires at least 64 mA considering the existing technology) is not clearly indicated; and the list of processes/features available on the UICC is not indicated to the ME whereas each feature may require a specific value of the electrical current for better performance.

An embodiment proposes an alternative approach in which an Extended Get Interface Power Request is created to allow the ME to retrieve exhaustive electrical related data from the UICC for each feature/process supported by the UICC and preferably also or alternatively the existing response to the Get Interface Power Request is updated to add an indication about the support of High Density Memory.

According to one aspect, the present invention provides a mobile device comprising: an interface for a smart card; a processor operable to define a maximum power supply value for the smart card and to inform the smart card of the maximum power supply value; and a power circuit operable for providing power to the smart card, up to the defined maximum power supply value; wherein the processor is operable to request electrical related information for processes supported by the smart card and, in response, is operable to receive data identifying the processes and their classes of current, and wherein said processor is operable to define the maximum power supply value for the smart card in dependence upon the data identifying the processes and their classes of current. The processes may be software applications that run on the smart card or specific features of such applications which require a specific minimum electrical current to work. They may also be features of the operating system that is run on the smart card. Examples of features include an ICCD interface that provides support for APDUs for legacy applications over the USB interface; and EEM that offers an interface for the IP stack over the USB interface.

In one embodiment, the processor requests the electrical related information by sending an Extended Get Interface Power Request to the smart card and receives data identifying the processes and their classes of current from the smart card. The processor may send the smart card a Get Interface Power Request prior to sending the Extended Get Interface Power Request and generates the Extended Interface Power Request in dependence upon the response received from the smart card to the Get Interface Power Request. The response to the Get Interface Power Request may include data identifying different voltage classes supported by the smart card and the Extended Interface Power Request may request electrical related information for processes of one of the supported voltage classes. If the smart card can run processes belonging to different voltage classes, then the processor can send an Extended Get Interface Power Requests in respect of each of the different voltage classes supported by the smart card.

In one embodiment, the processor may receive data from the smart card indicating whether or not the smart card supports high density memory. The processor may then use this information to define the maximum power supply value for the smart card. In such an embodiment, the processor may send a Get Interface Power Request command to the smart card and the data indicating whether or not the smart card supports high density memory may be received from the smart card in response to this request.

According to another aspect, the present invention also provides a mobile device comprising: an interface for a smart card; a processor operable to define a maximum power supply value for the smart card and to inform the smart card of the maximum power supply value; and a power circuit operable for providing power to the smart card, up to the defined maximum power supply value; wherein the processor is operable to receive data from the smart card indicating whether or not the smart card supports high density memory and is operable to define the maximum power supply value for the smart card in dependence upon whether or not the smart card supports high density memory.

The present invention also provides a smart card operable with a mobile device, the smart card comprising: an interface for interfacing with the mobile device; and a processor operable to receive a maximum power supply value from the mobile device and operable to make processes run on the smart card within the power range supplied by the mobile device; wherein the processor is operable to receive a request for electrical related information for processes supported by the smart card and, in response, is operable to send the mobile device data identifying the processes and their classes of current.

The processor may receive the request for electrical related information as an Extended Get Interface Power Request from the mobile device and may send the data identifying the processes and their classes of current in response thereto. Although not essential, the processor may also receive a Get Interface Power Request prior to receiving the Extended Get Interface Power Request. In such an embodiment, the processor generates a response to the Get Interface Power Request that includes data identifying different voltage classes supported by the smart card. If multiple voltage classes are supported, then multiple Extended Interface Power Requests may be received.

According to another aspect, the present invention provides a smart card operable with a mobile device, the smart card comprising: an interface for interfacing with the mobile device; and a processor operable to receive a maximum power supply value from the mobile device and operable to make processes run on the smart card within the power range supplied by the mobile device; wherein the processor is operable to send the mobile device data indicating whether or not the smart card supports high density memory for use by the mobile device in determining the maximum power supply value for the smart card.

The present invention also provides corresponding methods and computer implementable instructions. The instructions may be provided on a recording medium such as a CD-ROM or the like.

These and other aspects of the invention will become apparent from the following detailed description of exemplary embodiments described with reference to the accompanying drawings.

EXEMPLARY EMBODIMENTS

Overview

As will be explained in more detail below, the main idea of this embodiment is to define a new method allowing the ME to retrieve all the detailed electrical characteristics of processes/features that are available in the UICC before the ME sets the maximum value of the electrical current made available to the UICC over the USB interface.

Figure 1:
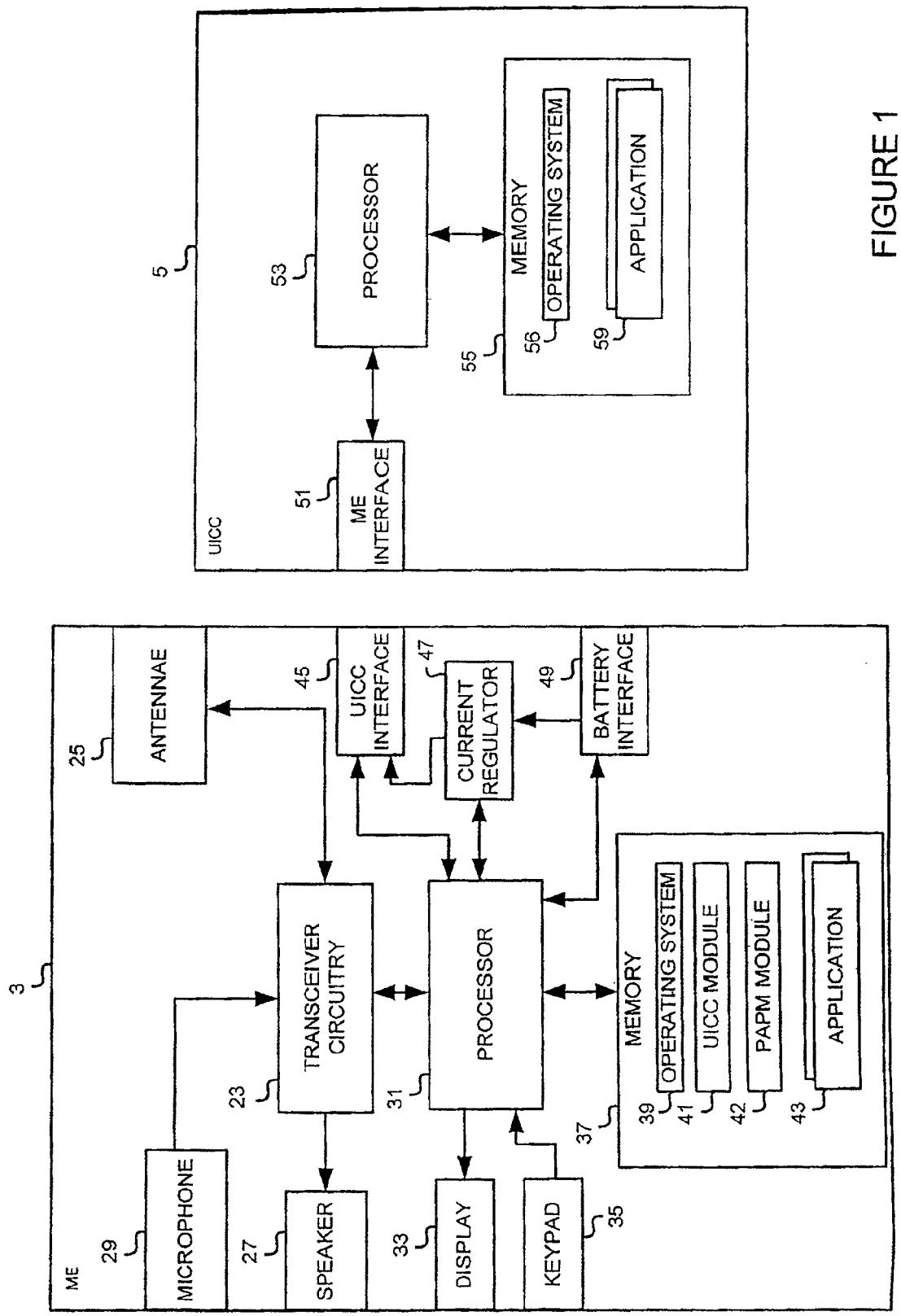
FIG. 1 is a block diagram illustrating the main components of a ME and a UICC.

FIG. 1 is a block diagram showing the main components of the ME 3 and the UICC 5 used in this embodiment. As shown, the ME includes a transceiver circuit 23 which is operable to transmit signals to and to receive signals from a remote base station via one or more antennae 25. As shown, the transceiver circuit 23 is connected to a loudspeaker 27 and a microphone 29 in the normal way to allow the user to make and receive calls. The ME also includes a processor 31 for controlling the operation of the ME and for controlling the user interaction with the ME via display 33 and a keypad 35. The processor 31 operates in accordance with software instructions stored within memory 37. As shown, these software instructions include, among other things, an operating system 39, a UICC module 41, a Power Allocation Policy Manager (PAPM) module 42 and a number of application modules 43. In this embodiment, the UICC module 41 is for controlling the interaction between the ME 3 and the UICC 5. Although the UICC module 41 and the PAPM module 42 are shown as separate software modules in the ME 3, in other embodiments, they may be provided as part of a single software module or part of the operating system 39. The ME 3 also includes a UICC interface 45 (in this case a USB interface) which provides the physical interface to the UICC 5; a current regulator 47 which provides a regulated power supply to the UICC 5 through the UICC interface 45; and a battery interface 49 which connects the ME 3 to its battery (not shown). As will be described in more detail below, the PAPM module 42 controls the current regulator 47 to define the maximum power to be made available to the UICC 5. When determining this maximum power value, the PAPM module 42 will consider, among other things, the remaining charge in the connected battery. The Battery interface 49 is therefore connected to the processor 31 to allow the PAPM module 42 make this determination.

As shown in FIG. 1, the UICC 5 includes a ME interface 51 for providing the physical interface to the ME 3. The UICC 5 also includes a processor 53 which operates in accordance with software instructions stored in memory 55. As shown, these software instructions include an operating system 56 and a number of software applications 59.

Operation

The operation of the ME 3 and the UICC 5 will now be described with reference to FIG. 2.

Figure 2:
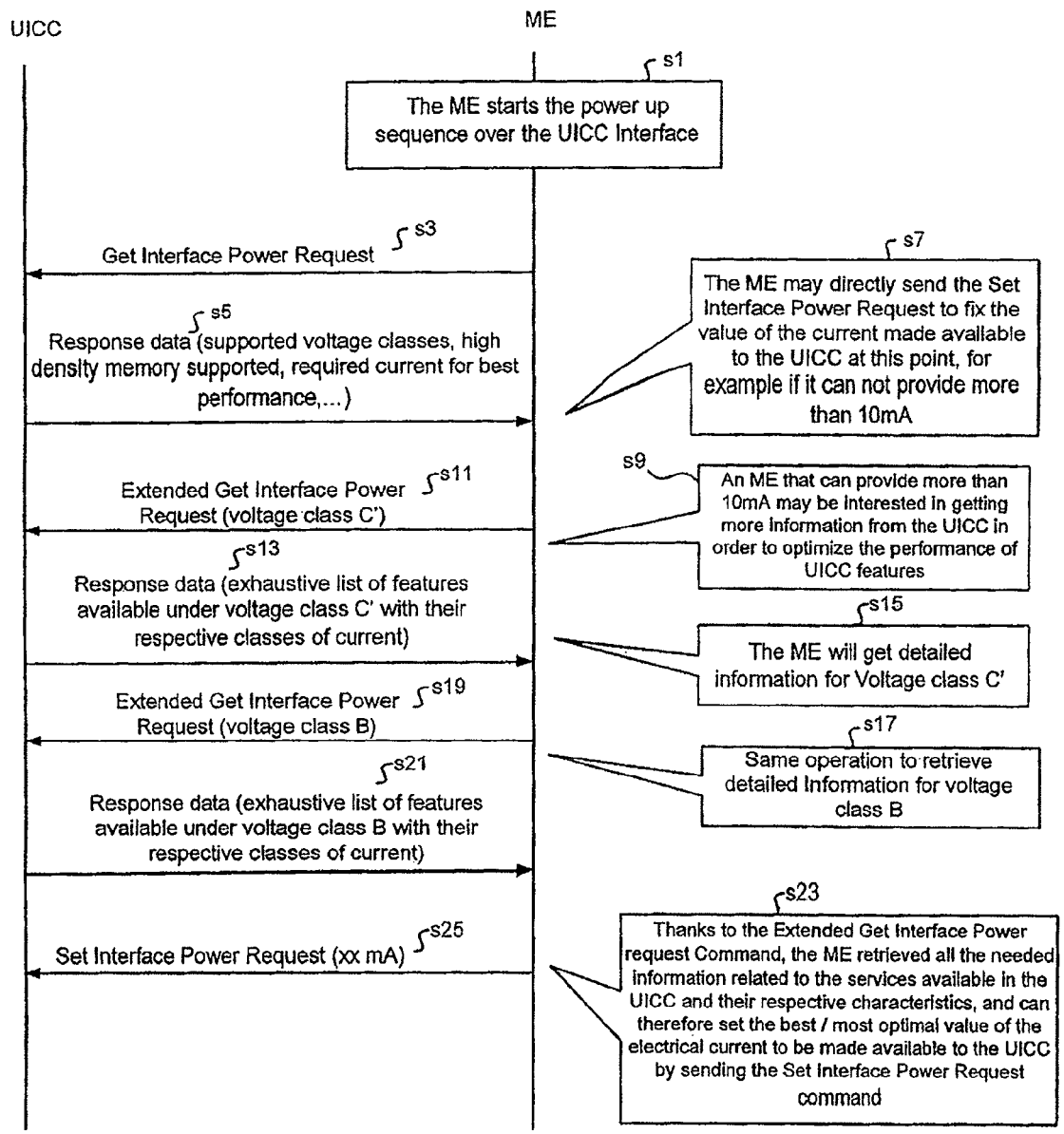
FIG. 2 is a communications timing diagram illustrating communications between the ME and the UICC just after the ME is powered up.

As shown in FIG. 2, in step s1, the ME 3 starts the power up sequence over the UICC interface 45. In step s3, the UICC module 41 generates and sends the Get Interface Power Request command to the UICC 5. The operating system 56 receives this command and in response generates and returns, in step s5, Response data that identifies, among other things, the supported voltage classes, whether or not it supports high density memory and the required electrical current for best performance. As indicated in step s7, at this point the ME 3 may directly send the Set Interface Power Request to fix the value of the current that is made available to the UICC 5. It may do this, for example, in dependence upon whether or not the UICC 5 supports high density memory or if the ME 3 can not presently provide more than some nominal of current, say 10 mA. In this illustration, however, the UICC module 41 generates and sends, in step s11, a new command "Extended Get Interface Power Request" requesting additional information of the processes available to the UICC 5 belonging to voltage class C'. The operating system 56 receives and processes this command and returns, in step s13, Response data providing an exhaustive list of processes it has available under voltage class C' together with their respective classes of current. The UICC module 41 receives and stores this information in step s15 and then, through steps s17, s19 and s21, will obtain the same information in respect of processes available to the UICC 5 under voltage class B. The PAPM module 42 then uses this information, in step s23, to determine and set the best/most optimal value of the electrical current to be made available to the UICC 5. The UICC module 41 then informs the UICC 5 of this set current value by sending the UICC 5, in step s25, the Set Interface Power Request command specifying the maximum current in milliamps. The UICC 5 thus knows the maximum current that will be available to it from the ME 3.

Command Implementation

As discussed above, this embodiment allows the ME 3 to retrieve exhaustive electrical information (voltage and required current) for all available services in the UICC 5 and this is achieved in two stages:

firstly, the existing response data for the existing Get Interface Power Request is updated to introduce an indication about the support of high density memory (the existing Get Interface Power Request could be updated as long as it remains backward compatible).

secondly, a new interface (command and response) is created to allow the ME 3 to retrieve all electrical related details for each feature supported by the UICC 5.

a) Updating the Existing Response Data for the Existing Get Interface Power Request:

| Offset | Field | Size | Value | Description |
|---|---|---|---|---|
| 0 | bVoltageClass | 1 | | Indicates the voltage classes supported by the UICC. If a class is supported, the corresponding bit is set to 1. |
| | | | b1 | Class A, reserved for USB 2.0 (optional use, not specified by ETSI SCP) |
| | | | b2 | Class B |
| | | | b3 | Class C' |
| | | | b6...4 | Reserved for Future Use, shall be set to 0 |
| | | | b7 | High Density Memory |
| | | | b8 | Class B activation preferred (see clause 7.1) |
| 1 | bMaxCurrent | 1 | | Maximum current that the UICC requires for best performance, expressed in 2 mA units. e.g. '0A' indicates 20 mA. |

In this embodiment, bit 7 (currently unused) is used to indicate whether or not High Density Memory is supported. If the <<High Density Memory>> bit is set to 1, this indicates that the UICC 5 can offer this High Density Memory feature provided that the ME 3 can supply the required electrical current. At the current time, the existing flash memory technology would request at least 64 mA under both voltage classes B and C' to work (the High Density Memory is made up of flash memory). This value is also mentioned in the current ETSI TS 102 600 document as a recommended value ("Terminals ( . . . ) should provide a current of at least 64 mA . . . "). However, this 64 mA may change in the future depending on the evolution of flash memory technology. In order to take into account this evolution and also to allow the ME 3 to retrieve more detailed electrical information about the processes supported by the UICC 5, the following new interface (as described in paragraph b) below) is provided in this embodiment.

b) Extended Get Interface Power Request and Response Data

| Offset | Field | Size | Value | Description |
|---|---|---|---|---|
| 0 | bmRequest | 1 | 'C0' | 'C0' for Get Interface Power |
| 1 | bRequest | 1 | '01' | Get Interface Power Request |
| 2 | wValue | 2 | '000B'/ | Retrieve Class B processes |
| | | | '000C'/ | Retrieve class C' processes |
| | | | '00FF' | Retrieve processes under the current voltage class Other values Reserved for Future Use |
| 4 | wIndex | 2 | '0000' | |
| 6 | wLength | 2 | '0003' | Number of bytes in the data stage |

Extended Get Interface Power request

In this embodiment, the wValue parameter is used to notify the UICC 5 to return the available processes with their respective required electrical current values under the voltage class indicated in the wValue parameter. In this embodiment, the expected response data will be contained in 3 bytes.

In one embodiment, the response data for this Extended Get Interface Power request may be defined as follows:

| Offset | Field | Size | Value | Description |
|---|---|---|---|---|
| 0 | bFeaturesList | 1 | | Bit field used to indicate the functionalities supported by the UICC when powered under the indicated voltage class<br>b1: USB ICCD device class<br>b2: USB CDC EEM device class<br>b3: USB Mass Storage device class<br>b4: High density memory<br>b5 . . . 8: Reserved for Future Use, shall be set to 0 |
| 1 | bMinCurrent | 2 | | Bit field indicating the class of current that the UICC requires under the indicated voltage class to make the processes indicated in bFeaturesList available:<br>b2 to b1: class of current for service b1 in bFeaturesList<br>b4 to b3: class of current for service b2 in bFeaturesList<br>b6 to b5: class of current for service b3 in bFeaturesList<br>b16 to b7: Reserved for Future Use, shall be set to 0 |

Coding of bFeaturesList
a bit set to 1 indicates that the corresponding feature is supported/available
Coding of the classes of current indicated in bMinCurrent: $b_n b_{n-1}$:
00 (Class 0)=10 mA
01 (Class 1)=20 mA
10 (Class 2)=64 mA
11 (Class 3)=Reserved For future Use
These values are the minimum required values for each class. By using one particular byte in the Extended Get Interface Power request and the proposed coding of the associated response data on only three bytes, this embodiment can address the existing limitations described above with minimal impact.

Modifications and Alternatives

A detailed embodiment has been described above. As those skilled in the art will appreciate, a number of modifications and alternatives can be made to the above embodiment whilst still benefiting from the inventions embodied therein.

In the above embodiment, a mobile telephone based telecommunications system was described. As those skilled in the art will appreciate, the techniques described in the present application can be employed in other communications system. Other communications nodes or devices may include user devices such as, for example, personal digital assistants, portable telephones, laptop computers etc.

In the above embodiments, a number of software modules were described. As those skilled will appreciate, the software modules may be provided in compiled or un-compiled form and may be supplied to the UICC or to the ME as a signal over a computer network, or on a recording medium. Further, the functionality performed by part or all of this software may be performed using one or more dedicated hardware circuits. However, the use of software is preferred as it facilitates the updating of the UICC 5 and of the MEs 3 in order to update their functionalities.

In the above embodiment, the UICC interfaced with the ME via respective interfaces on each device. As those skilled in the art will appreciate, these interfaces may be physical (contact) type interfaces or they may by wireless (non-contact) type interfaces.

In the above embodiment, a current regulator was provided to control the maximum power supply value provided to the UICC. As those skilled in the art will appreciate, other control circuits can be used to achieve the same result. For example, where the interface is a non-contact interface, the power control circuit may limit the magnitude of a magnetic or electric field generated to power the UICC.

In the embodiment described above, the smart card's operating system generated and responded to the Get Interface Power Requests received from the ME. As those skilled in the art will appreciate, this functionality may be performed by some other dedicated software module or hardware circuit instead of the operating system.

In the above embodiment, the response to the existing Get Interface Power Request was modified to include data indicating if the smart card supports mass storage. As those skilled in the art will appreciate, it is not essential to modify this existing command in this way. Instead, this information may be included in the response to the Extended Get Interface Power Request.

Various other modifications will be apparent to those skilled in the art and will not be described in further detail here.

This application is based upon and claims the benefit of priority from British patent application No. 0905798.5, filed on Apr. 3, 2009, the disclosure of which is incorporated herein in its entirety by reference.

The invention claimed is:

1. A mobile device comprising:
   an interface for a smart card;
   a processor operable to define a maximum power supply value for the smart card and to inform the smart card of the maximum power supply value; and
   a power circuit operable for providing power to the smart card, up to the defined maximum power supply value;
   wherein the processor is operable to request electrical related information for processes supported by the smart card and, in response, is operable to receive data identifying the processes and their classes of current, and wherein said processor is operable to define the maximum power supply value for the smart card in dependence upon the data identifying the processes and their classes of current,
   wherein the smart card includes a memory that stores software applications, and a processor that operates in accordance with the software applications,
   wherein the processor in the mobile device is operable to receive data from the smart card indicating whether or not the smart card supports high density memory and is operable to define the maximum power supply value for the smart card in dependence upon whether or not the smart card supports high density memory, wherein the processor in the mobile device is operable to request said electrical related information by sending an Extended Get Interface Power Request to the smart card and is operable to receive data identifying the processes and their classes of current from the smart card, wherein the processor in the mobile device is operable to send the smart card a Get Interface Power Request prior to sending said Extended Get Interface Power Request and is operable to generate the Extended Interface Power Request in dependence upon a response received from the smart card to the Get Interface Power Request, and wherein the response to the Get Interface Power Request includes data identifying different voltage classes supported by the smart card and wherein the Extended Interface Power Request requests electrical related information for processes supported by one of the supported voltage classes.

2. A mobile device according to claim 1, wherein the processor in the mobile device is operable to send multiple Extended Get Interface Power Requests for the different voltage classes supported by the smart card.

* * * * *